US010641412B2

United States Patent
Karschnia et al.

(10) Patent No.: US 10,641,412 B2
(45) Date of Patent: May 5, 2020

(54) STEAM TRAP MONITOR WITH DIAGNOSTICS

(71) Applicant: Rosemount Inc., Chanhassen, MN (US)

(72) Inventors: Robert J. Karschnia, Chaska, MN (US); Thomas M. Moser, Chanhassen, MN (US)

(73) Assignee: ROSEMOUNT INC., Shakopee, MN (US)

( * ) Notice: Subject to any disclaimer, the term of this patent is extended or adjusted under 35 U.S.C. 154(b) by 50 days.

(21) Appl. No.: 13/630,791

(22) Filed: Sep. 28, 2012

(65) Prior Publication Data

US 2014/0090712 A1  Apr. 3, 2014

(51) Int. Cl.
*F16T 1/48* (2006.01)
*F16K 37/00* (2006.01)

(52) U.S. Cl.
CPC ............... *F16K 37/00* (2013.01); *F16T 1/48* (2013.01); *Y10T 137/0318* (2015.04); *Y10T 137/8208* (2015.04)

(58) Field of Classification Search
CPC ..... F16T 1/48; F16T 1/02; F16T 1/165; F16T 1/24; F16T 1/45; F16T 1/00; F22B 37/426; F22B 37/44; F22B 35/18; F22B 37/428; Y10T 137/8158; Y10T 137/3028; Y10T 137/3003; Y10T 137/304; Y10T 137/3043; Y10T 137/3046; Y10T 137/3052; Y10T 137/0318; Y10T 137/0402; Y10T 137/3068; Y10T 137/3102;

(Continued)

(56) References Cited

U.S. PATENT DOCUMENTS

| 3,060,377 A | 10/1962 | Schmidt | 324/220 |
| 3,204,455 A | 9/1965 | Kallmann | 73/861.26 |

(Continued)

FOREIGN PATENT DOCUMENTS

| AU | 8477798 | 8/1999 |
| CA | 2173794 | 4/1996 |

(Continued)

OTHER PUBLICATIONS

Pereira, 2009, Fatigue Damage Behavior of Structural ComponentsFatigue Damage Behavior of Structural Components under Variable Amplitude Loading, Mechanica Experimental, vol. 17, p. 75-85.*

(Continued)

*Primary Examiner* — Stephanie E Bloss
*Assistant Examiner* — Lisa E Peters
(74) *Attorney, Agent, or Firm* — Westman, Champlin & Koehler, P.A.

(57) ABSTRACT

A steam trap monitor includes a process variable sensor configured to sense a process variable related to operation of a steam trap. A memory contains information related to a baseline parameter of the process variable. Diagnostic circuitry calculates a current parameter of the process variable sensed by the process variable sensor and compares the current parameter of the process variable with the baseline parameter. Based on the comparison, the diagnostic circuitry responsively provides a diagnostic output based upon the comparison. The baseline and current parameter are based on a time period during which the steam trap is open or closed.

13 Claims, 4 Drawing Sheets

(58) Field of Classification Search
CPC ......... Y10T 137/4266; Y10T 137/7313; Y10T 137/7737; Y10T 137/8593; Y10T 137/86445; Y10T 137/8208; F16K 31/26; F16K 37/0041; F16K 37/005; F16K 37/00
USPC ......... 702/60, 62, 50, 52, 183, 182; 340/605
See application file for complete search history.

(56) References Cited

U.S. PATENT DOCUMENTS

| | | | |
|---|---|---|---|
| 3,406,342 A | 10/1968 | Hubner | 325/2 |
| 3,625,057 A | 12/1971 | Yoshiyama et al. | 73/861.27 |
| 3,764,984 A | 10/1973 | McCartney | 340/168 |
| 4,160,239 A | 7/1979 | Adamson | 340/152 |
| 4,249,697 A | 2/1981 | Savage, Jr. | 236/94 |
| 4,305,548 A * | 12/1981 | Miner et al. | 237/67 |
| 4,333,339 A | 6/1982 | NcNeely et al. | 116/217 |
| 4,481,503 A | 11/1984 | Lehman et al. | 340/518 |
| 4,511,887 A | 4/1985 | Fiore | 340/539 |
| 4,575,258 A | 3/1986 | Wall | 374/104 |
| 4,605,065 A | 8/1986 | Abercrombie | 166/250 |
| 4,630,633 A | 12/1986 | Vallery | 137/185 |
| 4,649,898 A | 3/1987 | Martinson | 126/369 |
| 4,665,385 A | 5/1987 | Henderson | 340/539 |
| 4,705,212 A * | 11/1987 | Miller et al. | 236/54 |
| 4,764,024 A | 8/1988 | Ryan | 374/39 |
| 4,783,987 A | 11/1988 | Hager et al. | 73/32 |
| 4,788,849 A * | 12/1988 | Yonemura et al. | 73/40.5 A |
| 4,898,022 A | 2/1990 | Yumoto et al. | 73/46 |
| 4,937,558 A | 6/1990 | Robinet et al. | 340/606 |
| 4,945,343 A | 7/1990 | Rodriguez | 340/606 |
| 4,960,079 A | 10/1990 | Marziale et al. | 122/504.2 |
| 5,003,295 A | 3/1991 | Kleven | 340/581 |
| 5,065,785 A | 11/1991 | Deacon et al. | |
| 5,101,774 A | 4/1992 | Marziale et al. | 122/504.2 |
| 5,154,080 A | 10/1992 | Hill et al. | |
| 5,208,162 A | 5/1993 | Osborne et al. | 436/6 |
| 5,329,465 A | 7/1994 | Arcelia et al. | 364/551.01 |
| 5,372,046 A | 12/1994 | Kleven et al. | 73/861.22 |
| 5,400,645 A | 3/1995 | Kunze et al. | 73/40.5 |
| 5,408,867 A | 4/1995 | Kunze et al. | 73/40.5 |
| 5,429,001 A | 7/1995 | Kleven | 73/861.22 |
| 5,433,104 A | 7/1995 | Kunze et al. | 73/40.5 |
| 5,491,092 A | 2/1996 | Colvin | 436/1 |
| 5,509,311 A | 4/1996 | Lew | 3/661 |
| 5,517,537 A | 5/1996 | Greene et al. | 376/252 |
| 5,519,330 A | 5/1996 | Yamauchi et al. | 324/700 |
| 5,533,383 A | 7/1996 | Greene et al. | 73/40.5 |
| 5,571,944 A | 11/1996 | Pfeifer et al. | 73/24.04 |
| 5,594,180 A | 1/1997 | Carpenter et al. | 73/861.356 |
| 5,597,534 A | 1/1997 | Kaiser | 422/82.02 |
| 5,606,513 A | 2/1997 | Louwagie et al. | 364/510 |
| 5,646,338 A | 7/1997 | Mercusot et al. | 73/86 |
| 5,650,943 A | 7/1997 | Powell et al. | 364/550 |
| 5,691,896 A | 11/1997 | Zou et al. | 364/157 |
| 5,734,098 A | 3/1998 | Kraus et al. | 73/61.62 |
| 5,741,978 A | 4/1998 | Gudmundsson | 73/861.04 |
| 5,788,147 A | 8/1998 | Navarro | 236/59 |
| 5,926,096 A | 7/1999 | Mattar et al. | 340/606 |
| 5,992,436 A | 11/1999 | Hellman et al. | 137/1 |
| 6,123,144 A | 9/2000 | Morman et al. | 165/104.32 |
| 6,145,529 A | 11/2000 | Hellman et al. | 137/1 |
| 6,186,004 B1 | 2/2001 | Kaduchak et al. | 73/596 |
| 6,279,593 B1 | 8/2001 | Sheppard | 137/1 |
| 6,290,778 B1 | 9/2001 | Zugibe | 134/1 |
| 6,332,112 B1 | 12/2001 | Shukunami et al. | 702/56 |
| 6,338,283 B1 | 1/2002 | Blazquez Navarro et al. | 73/865.8 |
| 6,367,328 B1 | 4/2002 | Gorman et al. | 73/592 |
| 6,453,247 B1 | 9/2002 | Hunaidi | 702/51 |
| 6,471,823 B1 | 10/2002 | Stewart | 157/47.1 |
| 6,571,180 B1 * | 5/2003 | Turner et al. | 702/45 |
| 6,594,603 B1 | 7/2003 | Eryurek et al. | 702/104 |
| 6,595,059 B2 | 7/2003 | Gorman et al. | 73/592 |
| 6,601,005 B1 | 7/2003 | Eryurek et al. | 702/104 |
| 6,606,573 B2 | 8/2003 | Wheeler | 702/56 |
| 6,675,665 B2 | 1/2004 | Blazquez Navarro et al. | 73/865.8 |
| 6,710,776 B2 | 3/2004 | Usaki | |
| 6,717,658 B1 | 4/2004 | Saini et al. | 356/70 |
| 6,725,179 B1 | 4/2004 | Nagase | |
| 6,725,705 B1 | 4/2004 | Huebler et al. | 73/40.5 |
| 6,782,762 B2 | 8/2004 | Cage | 73/861.355 |
| 6,804,992 B2 | 10/2004 | Goodman et al. | 73/40.5 |
| 6,871,148 B2 | 3/2005 | Morgen et al. | 702/48 |
| 6,891,477 B2 | 5/2005 | Aronstam | 340/606 |
| 6,912,918 B1 | 7/2005 | Lynworth et al. | 73/861.26 |
| 6,977,815 B2 | 12/2005 | Hsu | 361/704 |
| 7,043,969 B2 | 5/2006 | Matsiev et al. | 73/54.41 |
| 7,069,802 B2 | 7/2006 | Mikhail et al. | 74/410 |
| 7,130,804 B2 | 10/2006 | Fujiwara | |
| 7,148,611 B1 | 12/2006 | Liu | 310/366 |
| 7,203,626 B2 | 4/2007 | Quake et al. | 702/189 |
| 7,246,036 B2 | 7/2007 | Cheskaty et al. | 702/183 |
| 7,290,450 B2 | 11/2007 | Brown et al. | 73/579 |
| 7,385,503 B1 | 6/2008 | Wells et al. | 340/539.26 |
| 7,579,947 B2 | 8/2009 | Peluso | 340/539.26 |
| 7,664,610 B2 * | 2/2010 | Anderson et al. | 702/51 |
| 7,698,102 B2 | 4/2010 | Fujiwara | |
| 7,702,484 B2 | 4/2010 | Armstrong et al. | 702/183 |
| 7,803,314 B1 | 9/2010 | Tercho | |
| 7,912,675 B2 | 3/2011 | Quake et al. | 702/182 |
| 8,050,875 B2 | 11/2011 | Karschnia | 702/251 |
| 8,686,867 B2 | 4/2014 | Liao et al. | |
| 8,935,126 B2 | 1/2015 | Armstrong et al. | |
| 2001/0033631 A1 | 10/2001 | Sakamaki | 376/305 |
| 2002/0029572 A1 | 3/2002 | Kangai et al. | 60/685 |
| 2002/0078752 A1 | 6/2002 | Braunling et al. | 73/627 |
| 2002/0120422 A1 | 8/2002 | Nagase | 702/127 |
| 2002/0124666 A1 | 9/2002 | Navarro et al. | 73/865.8 |
| 2003/0041653 A1 | 3/2003 | Matsiev et al. | 73/54.25 |
| 2003/0042007 A1 | 3/2003 | Sandu et al. | 165/94 |
| 2003/0056607 A1 | 3/2003 | Aronstam | 73/865.8 |
| 2003/0074981 A1 * | 4/2003 | Rebik | F16K 31/26 73/861.57 |
| 2003/0118150 A1 | 6/2003 | Hirabayashi et al. | 378/59 |
| 2003/0183537 A1 | 10/2003 | Eden et al. | 205/775.5 |
| 2004/0012264 A1 | 1/2004 | Burger et al. | 307/64 |
| 2004/0024544 A1 * | 2/2004 | Guebert | F16T 1/48 702/33 |
| 2004/0090866 A1 | 5/2004 | Goodman et al. | 367/135 |
| 2005/0011278 A1 | 1/2005 | Brown et al. | 73/861.18 |
| 2005/0145019 A1 | 7/2005 | Matsiev et al. | 73/53.01 |
| 2005/0189017 A1 | 9/2005 | Eryurek | 137/487.5 |
| 2006/0037399 A1 | 2/2006 | Brown | 73/580 |
| 2006/0113960 A1 | 6/2006 | Thulesius et al. | 320/133 |
| 2006/0118647 A1 * | 6/2006 | Cheskaty | F16T 1/48 236/93 R |
| 2006/0118648 A1 * | 6/2006 | Armstrong et al. | 236/93 R |
| 2006/0122808 A1 | 6/2006 | Quake et al. | 702/183 |
| 2006/0174707 A1 | 8/2006 | Zhang | 73/592 |
| 2007/0073495 A1 | 3/2007 | Anderson et al. | 702/50 |
| 2008/0150737 A1 * | 6/2008 | Karschnia | F22B 37/428 340/605 |
| 2008/0243287 A1 * | 10/2008 | Potdar | F01D 17/145 700/108 |
| 2009/0199907 A1 * | 8/2009 | Aloni | F16T 1/02 137/171 |
| 2011/0234418 A1 | 9/2011 | Liao et al. | |
| 2012/0109539 A1 * | 5/2012 | Hasegawa | B23Q 17/008 702/34 |
| 2014/0090712 A1 | 4/2014 | Karschnia et al. | |

FOREIGN PATENT DOCUMENTS

| | | |
|---|---|---|
| CN | 203147258 | 8/2013 |
| DE | 39 13 715 A1 | 11/1989 |
| DE | 4320395 | 6/1993 |
| EP | 0 697 595 | 2/1996 |
| EP | 0697586 | 2/1996 |
| EP | 0718342 | 6/1996 |
| EP | 0949447 | 10/1999 |

(56) References Cited

FOREIGN PATENT DOCUMENTS

| | | |
|---|---|---|
| EP | 0 972 982 | 1/2000 |
| EP | 1 280 026 | 1/2003 |
| EP | 1 831 767 | 6/2011 |
| EP | 1 836 585 | 6/2011 |
| FR | 2395458 | 6/1977 |
| GB | 2 189 321 | 10/1987 |
| GB | 2 231 407 | 11/1990 |
| GB | 2266956 | 11/1993 |
| JP | 59176643 | 10/1984 |
| JP | 61050008 | 3/1986 |
| JP | 62080535 | 4/1987 |
| JP | 63169532 | 7/1988 |
| JP | 01124739 | 3/1989 |
| JP | 01109235 | 4/1989 |
| JP | 01187430 | 7/1989 |
| JP | 1210700 | 8/1989 |
| JP | 01311242 | 12/1989 |
| JP | 02059637 | 2/1990 |
| JP | 02107897 | 4/1990 |
| JP | 02141637 | 5/1990 |
| JP | 02291937 | 12/1990 |
| JP | 03037541 | 2/1991 |
| JP | 03110436 | 5/1991 |
| JP | 03249534 | 11/1991 |
| JP | 4-296299 | 10/1992 |
| JP | 05066172 | 3/1993 |
| JP | 05010844 | 1/1994 |
| JP | 08021780 | 1/1996 |
| JP | 08110328 | 4/1996 |
| JP | 08304220 | 11/1996 |
| JP | 09061283 | 3/1997 |
| JP | 2001027396 A | 1/2001 |
| JP | 2003-130289 | 5/2003 |
| JP | 2003-131707 | 5/2003 |
| JP | 2003-131708 | 5/2003 |
| JP | 2005-114366 | 4/2005 |
| JP | 2005214666 | 8/2005 |
| JP | 2003-315254 | 11/2007 |
| JP | 2011-106548 | 6/2011 |
| JP | 2011-208799 | 10/2011 |
| WO | WO98/10218 | 3/1998 |
| WO | WO 98/45975 | 10/1998 |
| WO | WO 98/46975 | 10/1998 |
| WO | WO99/39129 | 8/1999 |
| WO | WO00/16059 | 3/2000 |
| WO | WO 01/73382 | 10/2001 |
| WO | WO 2006/063196 | 6/2006 |
| WO | WO2006/063197 | 6/2006 |

OTHER PUBLICATIONS

FEMP, Steam Trap Performance Assessment, DOE/EE-0193, pp. 1-32 (Year: 1999).*
"Technical Overview of Time Synchronized Mesh Protocol (TSMP)", Dust Networks, Document Number: 025-0003-01, Last revised: Jun. 20, 2006, 18 pages.
"Introducing SteamEye®—wireless technology that lets you monitor any trap, anytime, anywhere." , www.armstrong-intl.com; © Armstrong International, Inc., 19 pages.
"R. Stahl's Intrinsic Safety Primer", R. Stahl, Inc., prior to Jan. 2011; 15 pages.
"Intrinsic Safety", Jacques Oudar, Journal of the Southern California Meter Association, Oct. 1981; 6 pages.
"Installation and Operating Instructions Model TA4500 TrapAlert™"; prior to Jan. 2011; one page.
"Model TA4500 TrapAlert", Armstrong International, Inc., IB-125 3.5M Apr. 1994; 26 pages.
"Why Inovonics 900 MHz Wireless? 3 Distinct reasons make it the Best!", prior Jan. 2011; 5 pages.
FA464DR Specifications, prior to Jan. 2011, one page.
Notification of Transmittal of the International Search Report and the Written Opinion of the International Searching Authority, or the Declaration, for PCT/US2005/028980, dated Feb. 23, 2007.
Decca, R.S.; Drew, H.D.; Empson, K.L. Mechanical Oscillator Tip-To-Sample Separation Control for Near-Field Optical Microscopy American Institute of Physics, 1997, pp. 1291-1295.
G. Asti et al. "The Activated Torsion Oscillation Magnetometer," Parma Italy, pp. 1-6.
Schmidt, Stepfan and Grimes, Craig A. "Elastic Modulus Measurement of Thin Films Coated onto Magnetelastic Ribbons," IEEE Transactions on Magnetics, vol. 37, No. 4, Jul. 2001, pp. 2731-2733.
Search Report and Written Opinion of the foreign application No. PCT/US2006/036415 filed Sep. 19, 2006.Delete the following paragraph if no English equivalents of foreign documents are submitted.
"Notification of Transmittal of the International Search Report and the Written Opinion of the International Searching Authority, or the Declaration" from related foreign patent application No. PCT/US2007/025359 dated Oct. 30, 2009; 15 pages.
Communication in European patent application No. 06803830.6, dated Oct. 7, 2008.
Communication in European patent application No. 06803830.6, dated Nov. 17, 2009.
Official Communication from Chinese patent application No. 200680032493.0, dated Sep. 18, 2009.
Communication in European patent application No. 07853343.7, dated Apr. 29, 2010.
Official Action from Russian patent application No. 2008116693m dated Jun. 23, 2009.
Official Communication from Chinese Patent App. No. 200780026755.7, dated Mar. 24, 2011.
Notification of Transmittal of the International Search Report and the Written Opinion of the International Searching Authority, or the Declaration, for PCT/US2013/060539, dated Feb. 3, 2014.
Office Action from Chinese Patent Application No. 201210513704.X, dated Sep. 17, 2015.
EP Communication from European patent Application No. 13773960.3, dated Jul. 16, 2015.
Examination Report from Australian Patent Application No. 2013323936, dated Dec. 2, 2015.
Office Action from Chinese Application No. 201210513704.X, dated Mar. 23, 2016.
Office Action from Japanese Application No. 2015-534560, dated Jun. 1, 2016.
Office Action from Canadian Application No. 2,886,521, dated Mar. 21, 2016.
Office Action from Russian Application No. 2015115964, dated Mar. 24, 2016.
Office Action from Australian Application No. 2013323936, dated Apr. 27, 2016.
Office Action from Japanese Application No. 2015-534560, dated Mar. 29, 2017.
Office Action from Canadian Application No. 2,886,521, dated Feb. 6, 2017.
Final Rejection Notice from Japanese Patent Application No. 2015-534560, dated Sep. 27, 2017, 2 pages.
Decision to Dismiss the Amendment from Japanese Patent Application No. 2015-534560, dated Sep. 27, 2017, 6 pages.
Accutech, Acoustic Monitor Field Unit User Guide, (May 2005), 31 pgs.
Accutech, Base Radio User Manual, (Jun. 2004), 29 pgs.
Accutech, Wireless Instrumentation Manager User Guide, (Apr. 2005), 34 pgs.
SmartWatch Continuous Leak Detection System, (Jul. 25, 2001), 13 pgs.
Spirax Sarco Spiratec R16C Automatic Steam Trap Monitor Operators Instructions, IM-P087-22 MI Issue 4, (1999), 8 pgs.
Spirax Sarco Spiratec R16C Automatic Steam Trap Monitor, TI-P087-20 MI Issue 4, (2004), 2 pgs.
Spirax Sarco Spiratec R16C Automatic Steam Trap Monitor Installation, Commissioning and Fault Finding Instructions, IM-P087-21 MI Issue 7, (2004), 24 pgs.
TrapMan Model TW5/TrapManager, Computerized Steam Trap Management System for Protective Maintenance, (Apr. 2003), 2 pgs.

(56) References Cited

OTHER PUBLICATIONS

Yarway, Installation, Operation and Maintenance Yarway SmarTrap Electronic Monitor for the Series 711/721/701-F2 Disc Trap (Standard, HP, HC & XHC), (2000).
PCT Search Report for International Application No. PCT/US05/44539, dated Oct. 10, 2006.
Armstrong Intelligent Monitoring Installation and Operation Manual Models: AD5000, ST5700, TD5100, International Armstrong (2014), 19 pgs.
ST5700 Steam Trap Monitoring, Armstrong International, (2011), 4 pgs.
Office Action from Japanese Patent Application No. 2015-534560, dated Oct. 31, 2018.
Office Action/Examination Report from Indian Patent Application No. 598/MUMNP/2015, dated Oct. 26, 2018.
Office Action from Japanese Patent Application No. 2015-534560, dated Feb. 6, 2019.

* cited by examiner

STEAM TRAP MONITOR WITH DIAGNOSTICS

BACKGROUND

The present invention is related to the monitoring of steam traps used in industrial processes. More particularly, the present invention is related to a system and method for detecting a leak or deterioration in a steam trap.

Steam traps are commonly used in many industries to remove unwanted water or condensate from steam lines. In a typical industrial plant, thousands of such devices may be deployed. A steam trap is generally a low technology device that is designed to be relatively inexpensive. Often, steam traps are completely mechanical.

A steam trap is generally designed to allow condensate to escape a pipe in order to maintain efficiency and reduce pipe "knocking." A typical steam trap may have one or more chambers and a member that is in physical contact with the condensate. As the level of the condensate rises above some threshold, the movable member within the steam trap actuates, or otherwise engages one or more valves to allow the condensate to escape. As the condensate escapes, the level of condensate within the steam trap is reduced to such an extent that the valve is closed and the trap re-pressurizes.

Steam traps experience very common problems; they often leak or stick in a closed position. Steam trap leakage is often due to wear of the movable member within the steam trap; deterioration or fouling of the valve(s) can cause a stick closed. Regardless of the cause, steam trap leakage or sticking is undesirable for a number of reasons. First, it takes a relatively large amount of energy to heat water into steam. Thus, a leaking steam trap will waste energy by allowing steam to escape before the energy content therein can be fully utilized. Further, many condensate removal systems are not designed for continuous pressurization, such as that caused by a steam leak. Accordingly, the component(s) downstream from a steam trap could be damaged, or otherwise degraded, by a continuous steam leak. Further, given a large leak, the steam pipe may not be able to supply sufficient steam pressure and flow to achieve its desired purpose. Stuck steam traps also prevent water, that can cause corrosive damage or water hammers, from being removed from the steam system.

Accordingly, there is an ongoing need to monitor and diagnose operation of steam traps.

SUMMARY

A steam trap monitor includes a process variable sensor configured to sense a process variable related to operation of a steam trap. A memory contains information related to a baseline parameter of the process variable. Diagnostic circuitry calculates a current parameter of the process variable sensed by the process variable sensor and compares the current parameter of the process variable with the baseline parameter. Based on the comparison, the diagnostic circuitry responsively provides a diagnostic output based upon the comparison. The baseline and current parameter are based on a time period during which the steam trap is open or closed.

DETAILED DESCRIPTION OF ILLUSTRATIVE EMBODIMENTS

In the present invention, a steam trap monitor is provided which includes a process variable sensor for use in performing diagnostics on a steam trap. The process variable sensor senses a process variable related to operation of the steam trap. For example, the sensed process variable can be related to the opening and/or closing of the steam trap. Diagnostic circuitry in the steam trap monitor calculates a current parameter of the process variable sensed by the process variable sensor. This is compared with a baseline parameter stored in a memory and used to responsively provide diagnostics.

Some prior art steam trap monitors simply provide an indication that the trap has completely failed, for example, it is stuck in an open or closed condition. However, it would also be desirable to identify a trap that is in the process of failing prior to its ultimate failure. This allows the steam trap to be replaced at a desired time without unnecessarily shutting down the industrial process. In one aspect, the present invention provides a predictive indicator that the steam trap is in the process of failing or that may soon completely fail soon. The prediction may optionally include a prediction of the remaining life of the steam trap before ultimate failure.

Embodiments of the present invention can be practiced with respect to any steam trap that has an inlet that is coupled, or couplable, to a steam source such as a steam pipe, and an outlet that periodically releases condensate and/or air, but otherwise is expected to maintain an elevated pressure with respect to the ambient environment. The present invention is not limited to the steam trap configurations shown or discussed herein.

Figure 1:
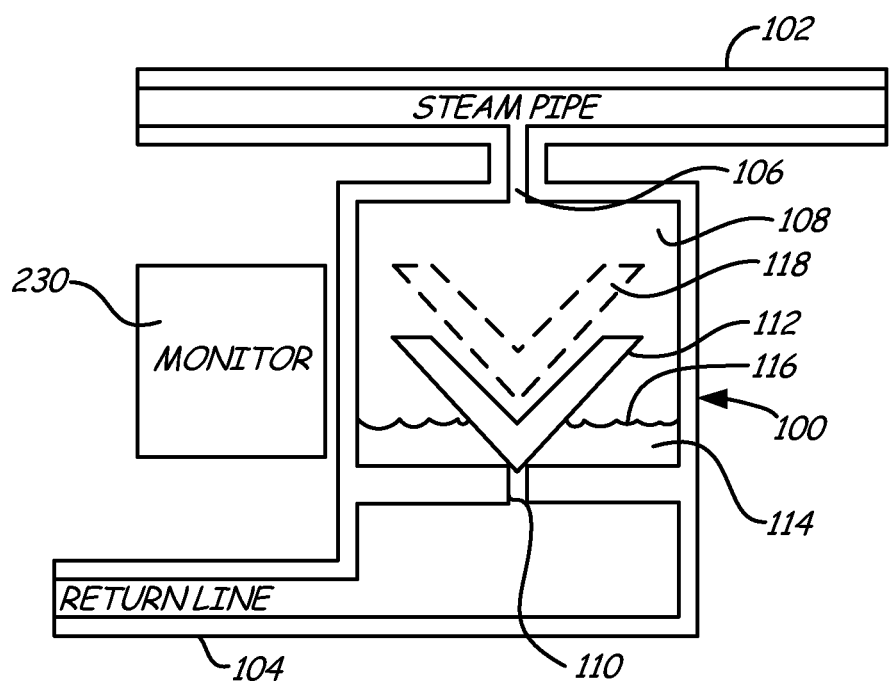
FIG. 1 is a diagrammatic view of a steam trap with which embodiments of the present invention are useful.

FIG. 1 is a diagrammatic view of a steam trap with which embodiments of the present invention are useful. Steam trap 100 is fluidically coupled to steam pipe 102 and water collection/return line 104. Steam pipe 102 has steam disposed therein. The steam may be static or flowing, and may be saturated steam or superheated steam. Condensate flowing, or otherwise present within steam pipe 102 will flow into inlet 106 and accumulate in the chamber 108. Chamber 108 includes an outlet port 110 that is closed or occluded by movable member 112. Movable member 112 may comprise a baffle or any other suitable physical structure. As condensate 114 accumulates within chamber 108, the level 116 of condensate 114 rises. As the level rises, the amount of condensate displaced by movable member 112 increases thereby increasing the degree to which the buoyancy of member 112 urges member 112 upward. At some point, the level of condensate 114 will reach a threshold where movable member 112 lifts into the position indicated in phantom at reference numeral 118. Once member 112 lifts, condensate 114 drains through outlet 110 for a short period of time. Once sufficient condensate 114 has drained, gravity will bring member 112 down into contact with outlet 110 thereby sealing outlet 110. In this manner, steam trap 100 will periodically release quantities of condensate 114 and some air and steam.

Figure 2:
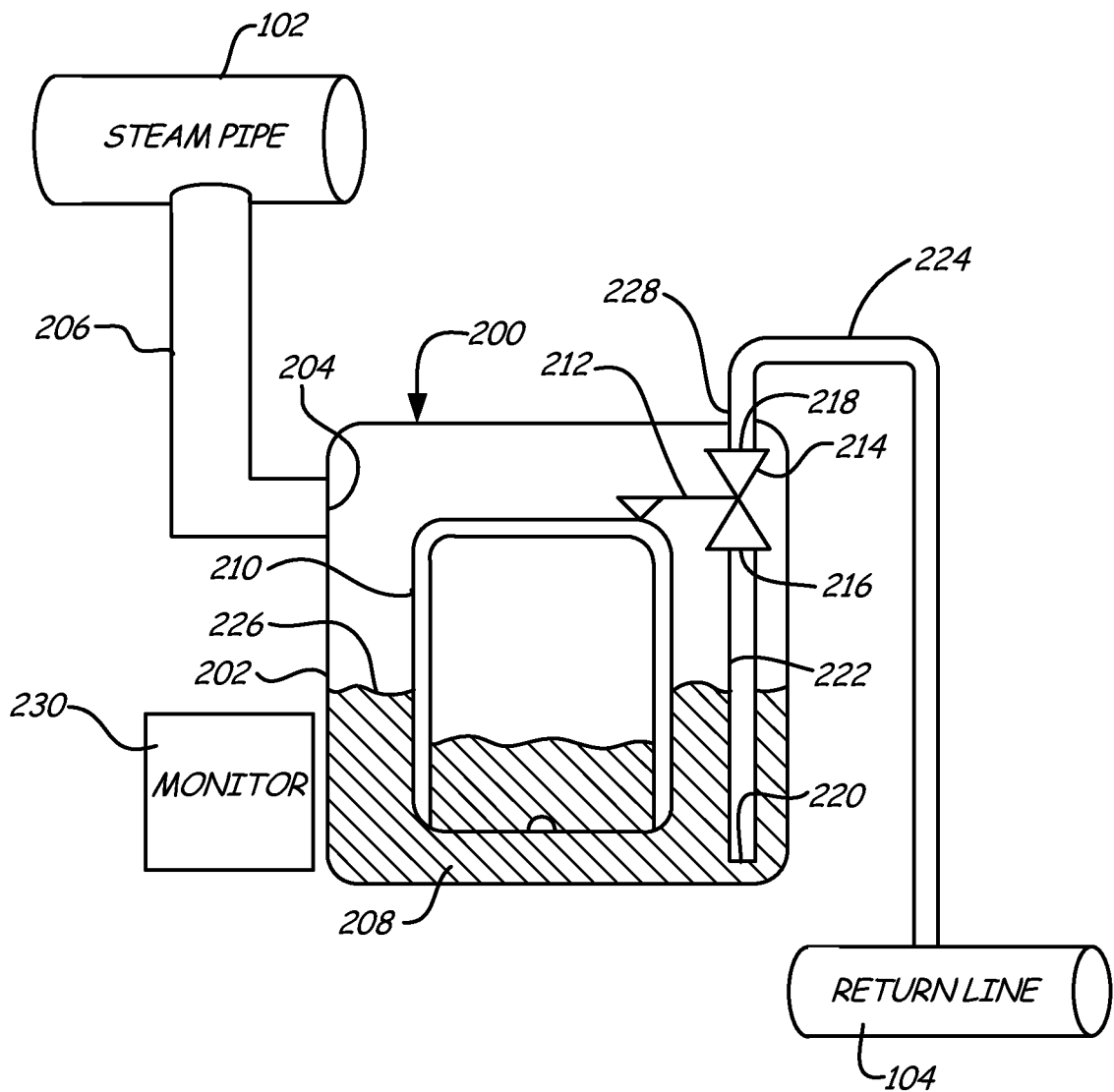
FIG. 2 is a diagrammatic view of another steam trap with which embodiments of the present invention are useful.

FIG. 2 is a diagrammatic view of another steam trap with which embodiments of the present invention are useful. Steam trap 200 is coupled to steam pipe 102 and return line 104. Trap 200 includes trap body 202 that is coupled to, or includes, inlet 204 that is fluidically coupled to steam pipe 102 through conduit 206. Accordingly, condensate, or other liquids, flowing or otherwise present within steam pipe 102 will descend through conduit 206 and enter trap body 202 via inlet 204. Fluid 208 thus accumulates within trap body 202. Float 210 is disposed within trap body 202 and is configured to float upon a selected amount of fluid 208. As float 210 rises, it will eventually come into contact with movable member 212 of valve 214. When float 210 moves member 212 sufficiently, valve 214 will open thereby coupling upstream portion 216 to downstream portion 218. Upstream portion 216 is fluidically coupled to location 220 proximate the bottom of trap body 202. Accordingly, fluid 208 proximate location 220 will flow into conduit 222; through valve 214; through conduit 224 and into return line 104. The flow of fluid 208 is facilitated by the relatively higher pressure within steam line 102, which pressure bears against surface 226 of fluid 208.

In order to allow embodiments of the present invention to be practiced with existing, or legacy, mechanical steam traps, it is preferred that no modifications need to be made to such devices. Thus, embodiments of the present invention are generally directed to providing steam trap monitoring for any steam trap that has an inlet and an outlet that periodically releases condensate without necessitating any modification to the steam trap itself, or requiring any wiring to be run to the steam trap. However, the invention is not limited to this configuration.

FIGS. 1 and 2 also illustrate a steam trap monitoring system 230 coupled to a steam trap 100/200 in accordance with an embodiment of the present invention. For simplicity, the steam trap 230 illustrated can be used with any steam trap. Steam trap monitor 230 is described below in greater detail and can be coupled to the body of the steam trap, in line with a conduit so that fluid actually flows through monitor 230, etc. Alternatively, monitor 230 can simply be positioned in the proximity of the steam trap 200, for example, attached to the conduit 224 or the trap body 202.

Figure 3:
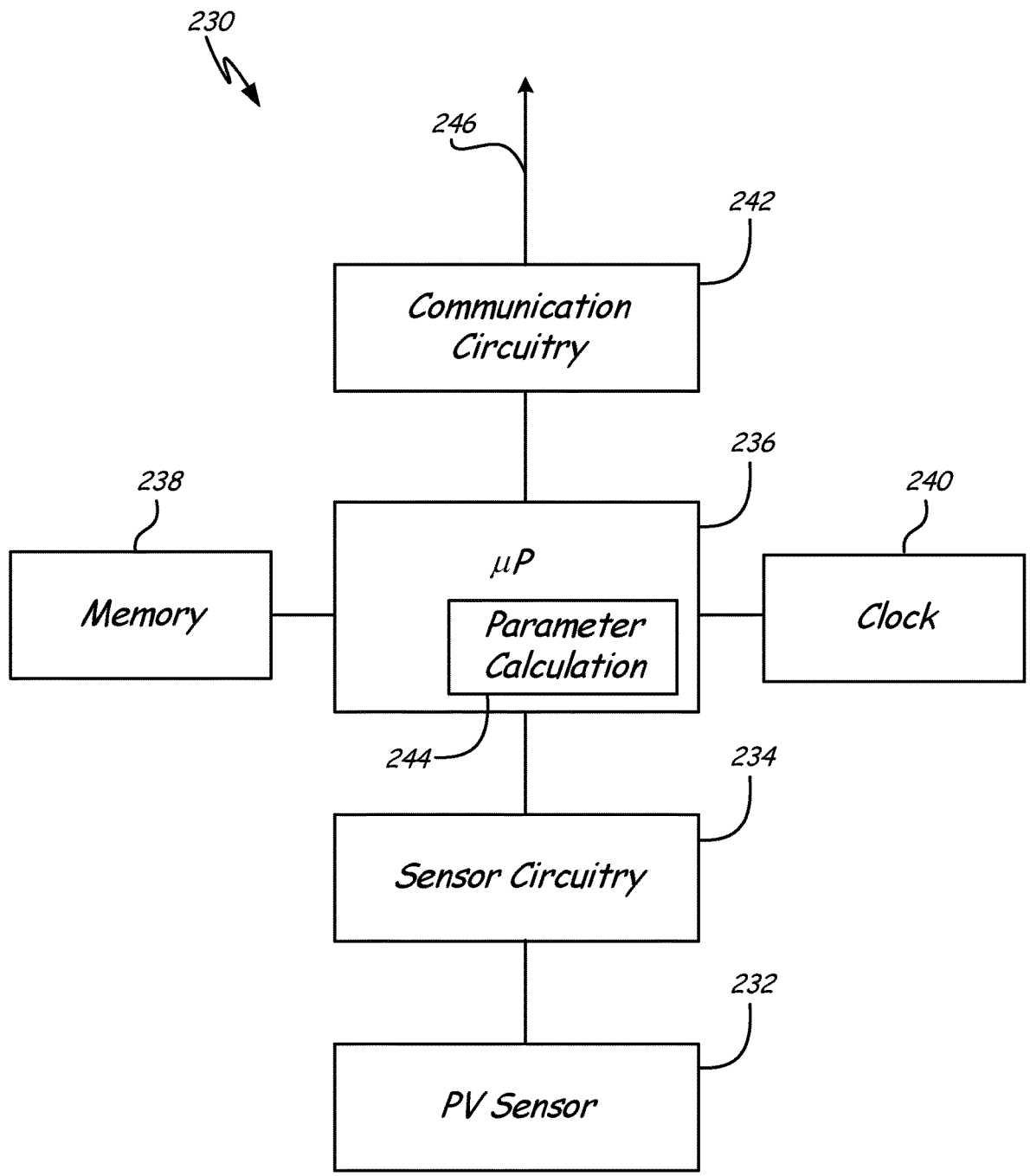
FIG. 3 is a simplified block diagram of a steam trap monitoring system.

FIG. 3 is a simplified block diagram of steam trap monitor 230. Steam trap monitor 230 includes a process variable sensor 232. Sensor 232 is configured to be positioned proximate steam trap 200, for example, the valve 214 shown in FIG. 2, or the movable member 112 shown in FIG. 1. Sensor 232 can be any type of process variable sensor which provides an output indicative of the opening and/or closing of the steam trap. For example, a temperature sensor can be used to sense changes in temperature due to the opening and closing of the steam trap. Further, an acoustic sensor can be used which is capable of detecting the noise generated by the opening or closing of the steam trap and/or noise as vapor or liquid is returned to the return line 104. Another example sensor is an analytical sensor which could be used to detect differences between steam and water.

The output from process variable sensor 232 is provided to sensor circuitry 234. Sensor circuitry 234 may include amplifiers, filters, an analog to digital converter, or other circuitry to provide a digital representation of the sensed process variable to a microprocessor 236. The microprocessor 236 operates in accordance with instructions stored in memory 238 and at a clock rate determined by a system clock 240. Microprocessor 236 is one example embodiment of diagnostic circuitry in accordance with the present invention and is used to perform diagnostics on a steam trap, for example steam trap 200, shown in FIG. 3. Communication circuitry 242 is configured to provide an output 246 related to the diagnostics performed by microprocessor 236. The output 246 can comprise, for example, a wired or wireless output, a local indicator such as a visual indication, an audible output, etc. In some configurations, if a wired output 246 is employed, the same connection can be used to provide power to the steam trap monitor 230. One example wired output is a two wire process control loop in which a current level is used to represent information. Digital information can also be modulated on such a two wire process control loop. A specific example is a process control loop in accordance with the HART® communication protocol. One example of a wireless output includes the WirelessHART® communication protocol. IEC 62591 Standard. In some configurations, steam trap monitor 230 includes an internal power source such as a battery or the like. Energy may also be scavenged for operating the steam trap monitor 230 from operation of the industrial process. For example, temperature differentials can be used to generate electricity, as can vibrations or other mechanisms. Solar cells or the like can be used to convert energy from light into electricity.

The microprocessor 236 monitors the process variable sensed by process variable sensor 232 and calculates a current parameter of the process variable using parameter calculation circuitry 244. This may comprise an algorithm or the like based upon programming instructions stored in memory 238. In one embodiment, the calculated parameter is related to the opening and/or closing of a valve or seal of the steam trap being monitored. The calculated parameter is then compared by microprocessor 236 to a baseline parameter stored in memory 238. Based upon this comparison, a diagnostic output is provided by communication circuitry 242. In one embodiment, the diagnostic output is a predictive output which provides an indication related to an impending failure of the steam trap 200.

Figures 4, 5:
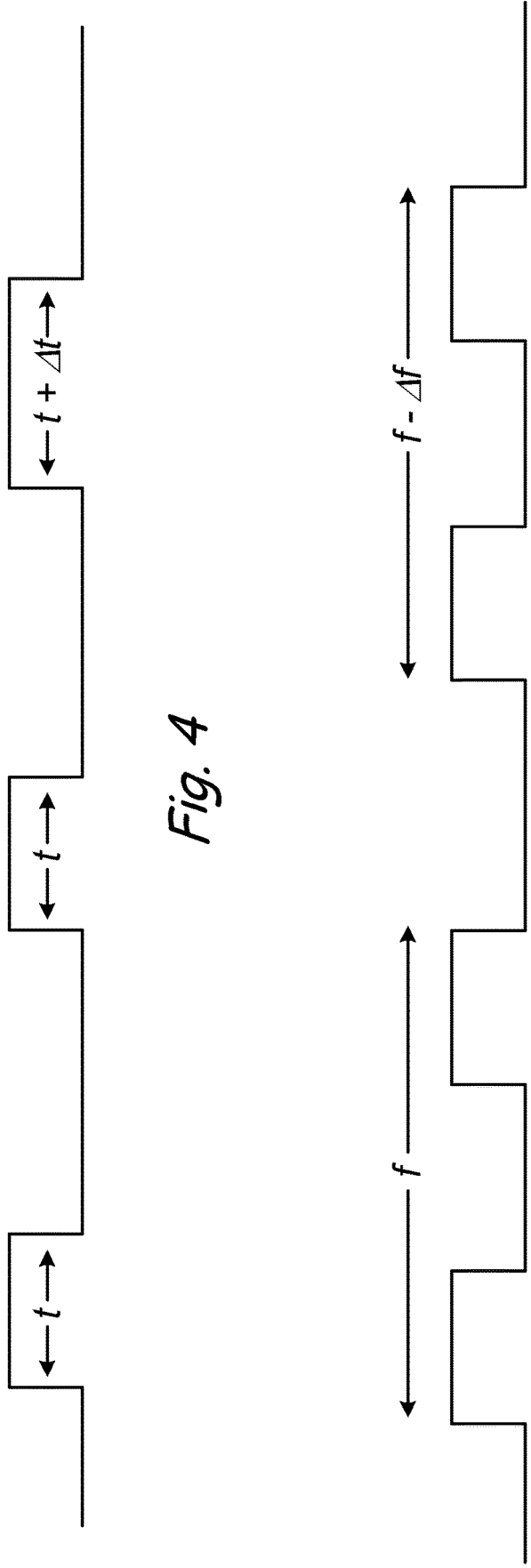
FIG. 4 is a graph illustrating the opening and closing of a steam trap with respect to time.
FIG. 5 is another graph illustrating the opening and closing of a steam trap with respect to time.

In one configuration, the calculated parameter relates to time, and specifically the time period (or duration) during which the steam trap is open and/or closed. For example, FIG. 4 is a graph of the output from the process variable sensor 232 versus time. During normal operation, the steam trap is open for a time t. Thus, time t is the baseline parameter stored in memory 238. As the steam trap is used, the duration during which the trap is open may change. For example, in FIG. 4 the steam trap open time period changes to t+Δt. This is the current parameter calculated by microprocessor 236. Microprocessor 236 performs diagnostics by comparing the baseline parameter t with the current parameter t+Δt. The comparison can be a simple threshold based comparison, or can be a more complex comparison such as observing trends in the duration during which the steam trap is open or closed. The comparison can also include an adjustable margin, such as a percentage. For example, if the current parameter is more than X % different from the baseline parameter, a diagnostic output can be triggered. Although FIG. 4 illustrates an increased duration during which the trap is open, the same technique can be used to detect a reduction in the duration. The diagnostic output indicates that something about the steam trap or the process has changed. For example, a seal of the trap may be starting to fail, one of the pipes is becoming clogged, etc. Thus, the diagnostics are predictive diagnostics which provide a diagnostic output prior to the ultimate failure of the steam trap. The predictive output can also include trending information or otherwise provide information related to the expected remaining useful life of the steam trap prior to its ultimate failure. This can be determined, for example, experimentally by observing failures in actual steam traps. The output can be based upon more than one time period. For example, multiple time periods can be averaged together, sorted into an order to create histogram type information, etc.

FIG. 5 illustrates another example embodiment of the present invention in which the frequency at which the steam trap is open and/or closed is used to perform diagnostics. In FIG. 5, the output from the process variable sensor is illustrated with respect to time. FIG. 5 illustrates a change in the frequency of opening of the steam trap 200. For example, in FIG. 5, during normal operation the steam trap opens with a period of f. In such a configuration, f is representative of a baseline parameter stored in memory 238. FIG. 5 also illustrates a second duration during which the steam trap is open, f−Δf. For example, if the steam trap begins opening more frequently than it had previously been opening, this may be an indication that insufficient condensate is being released during each opening thereby causing the steam trap to open more often. As in the case of the configuration illustrated in FIG. 4, the frequency of the opening can be compared to a baseline parameter stored in the memory 238, can be observed based upon trends, or other diagnostic techniques may be employed. The diagnostics are predictive diagnostics indicating that the steam trap is in the process of failing but has not yet completely failed. Trending or other techniques can be employed to provide an estimation of the remaining life of the steam trap prior to its ultimate failure. In addition to predicting the time to complete failure of the trap, the predictive diagnostics can provide an output related to the energy saving which would be obtained by replacing a failing or deteriorating steam trap prior to its ultimate failure. This may even be correlated to the amount of reduced carbon emissions which would be obtained if the steam trap were replaced. The diagnostics may be based upon more than one time based diagnostic technique. For example, the diagnostic techniques illustrated in FIGS. 4 and 5 may be employed simultaneously to provide more accurate diagnostics. In some configurations, the diagnostics are further based upon other information such as the temperature of escaping steam or temperature of the steam in the trap, the pressure of steam in the trap, the pressure during the release of steam, etc. The invention is not limited to the two time based parameters illustrated in FIGS. 4 and 5 and other time based parameters related to the opening and/or closing of the steam trap may be employed.

Although the present invention has been described with reference to preferred embodiments, workers skilled in the art will recognize that changes may be made in form and detail without departing from the spirit and scope of the invention. Another example diagnostic technique is to monitor a number of steam traps and count the number of venting cycles they experience. This information can then be statistically processed in order to determine an average number of cycles which the steam trap will experience prior to failure. This information can be used to as a lifetime predictor. For example, as the steam trap approaches the average, an output can be provided indicating that the steam trap is approaching its end of life.

What is claimed is:

1. A steam trap monitor used to monitor operation of a steam trap, the steam trap of the type having a moveable member which is periodically actuated by a process fluid in the steam trap causing the steam trap to open and thereby discharge the process fluid, the steam trap monitor, comprising:
   a process variable sensor configured to sense a process variable which changes due to discharge of the process fluid from the steam trap;
   a memory containing information related to a baseline parameter of the process variable; and
   diagnostic circuitry configured to calculate a current parameter of the process variable sensed by the process variable sensor, compare the current parameter of the process variable with the baseline parameter, and responsively estimate a time of ultimate failure of the steam trap and provide an energy savings attainable by replacing the steam trap before the estimated ultimate failure time of the steam trap.

2. The steam trap monitor of claim 1 wherein the process variable sensor comprises an acoustic sensor.

3. The steam trap monitor of claim 1 wherein the current parameter is a duration during which the steam trap is open.

4. The steam trap monitor of claim 1 wherein the current parameter is a duration during which the steam trap is closed.

5. The steam trap monitor of claim 1 wherein the current parameter is related to a time period between openings of the steam trap.

6. The steam trap monitor of claim 1 wherein the current parameter is a time period between closings of the steam trap.

7. A method for monitoring operation of a steam trap monitor used to monitor operation of a steam trap, the steam trap of the type having a moveable member which is periodically actuated by a process fluid in the steam trap causing the steam trap to open and thereby discharge the process fluid, the steam trap monitor, comprising:
   sensing a process variable with a process variable sensor which changes due to discharge of the process fluid from the steam trap;
   retrieving information from a memory related to a baseline parameter of the process variable;
   calculating a current parameter of the process variable with diagnostic circuitry;
   comparing the baseline parameter of the process variable with the current parameter of the process variable using the diagnostic circuitry; and
   responsively diagnosing operation of the steam trap based upon the step of comparing and responsively identifying an estimated time of failure and an energy savings attainable by replacing the steam trap before the estimated time of failure.

8. The method of claim 7 wherein the process variable sensor comprises an acoustic sensor.

9. The method of claim 7 wherein the current parameter is a duration during which the steam trap is open.

10. The method of claim 7 wherein the current parameter is a duration during which the steam trap is closed.

11. The method of claim 7 wherein the current parameter is related to a time period between openings of the steam trap.

12. The method of claim 7 wherein the current parameter is a time period between closing of the steam trap.

13. A steam trap monitor used to monitor operation of a steam trap, the steam trap of the type having a moveable member which is periodically actuated by a process fluid in the steam trap causing the steam trap to open and thereby discharge the process fluid, the steam trap monitor, comprising:

means for sensing a process variable which changes due to discharge of the process fluid from the steam trap;
means for retrieving information from a memory related to a baseline parameter of the process variable;
means for calculating a current parameter of the process variable;
means for comparing the baseline parameter of the process variable with the current parameter of the process variable;
means for responsively diagnosing operation of the steam trap based upon the step of comparing and responsively identifying an estimated time of failure and an energy savings attainable by replacing the steam trap before the estimated time of failure.

* * * * *